US012144374B2

(12) United States Patent
Rasmussen

(10) Patent No.: US 12,144,374 B2
(45) Date of Patent: Nov. 19, 2024

(54) DUAL-TANK ELECTRONIC CIGARETTE

(71) Applicant: Fontem Ventures B.V., Amsterdam (NL)

(72) Inventor: Dennis Rasmussen, Campbell, CA (US)

(73) Assignee: Fontem Ventures B.V., Amsterdam (NL)

( * ) Notice: Subject to any disclaimer, the term of this patent is extended or adjusted under 35 U.S.C. 154(b) by 126 days.

(21) Appl. No.: 16/114,526

(22) Filed: Aug. 28, 2018

(65) Prior Publication Data

US 2020/0068949 A1 Mar. 5, 2020

(51) Int. Cl.

| | |
|---|---|
| ***A24F 40/46*** | (2020.01) |
| ***A24B 15/167*** | (2020.01) |
| ***A24F 40/44*** | (2020.01) |
| ***A24F 40/48*** | (2020.01) |
| ***H05B 1/02*** | (2006.01) |

(52) U.S. Cl.
CPC ............ *A24F 40/46* (2020.01); *A24B 15/167* (2016.11); *A24F 40/44* (2020.01); *A24F 40/48* (2020.01); *H05B 1/0297* (2013.01)

(58) Field of Classification Search
CPC .......... A61M 15/0003; A61M 15/0066; A61M 15/06; A61M 15/00; A24F 40/30; A24F 47/008; A24F 40/10; A24F 40/50; A24F 40/44; A24F 40/485; A24F 40/46; A24F 40/48; A24F 40/42; A24F 40/40; A24F 40/53
See application file for complete search history.

(56) References Cited

U.S. PATENT DOCUMENTS

| | | | | |
|---|---|---|---|---|
| 6,234,167 | B1 * | 5/2001 | Cox | A61M 15/0003 128/200.14 |
| 9,271,528 | B2 | 3/2016 | Liu | |
| 2010/0059070 | A1 * | 3/2010 | Potter | A24F 42/60 131/194 |
| 2014/0000638 | A1 | 1/2014 | Sebastian et al. | |
| 2014/0123989 | A1 | 5/2014 | LaMothe | |
| 2014/0261488 | A1 * | 9/2014 | Tucker | A24F 40/50 131/328 |
| 2014/0366898 | A1 | 12/2014 | Monsees et al. | |
| 2015/0047662 | A1 | 2/2015 | Hopps | |
| 2015/0216237 | A1 * | 8/2015 | Wensley | A24F 47/008 131/273 |
| 2015/0320116 | A1 * | 11/2015 | Bleloch | A24F 40/44 219/628 |
| 2016/0353800 | A1 | 12/2016 | Di Carlo | |
| 2017/0013878 | A1 * | 1/2017 | Schuler | A24F 47/008 |
| 2017/0354181 | A1 * | 12/2017 | Fornarelli | B65D 15/02 |
| 2018/0325176 | A1 | 11/2018 | Burseg | |
| 2019/0124982 | A1 * | 5/2019 | Atkins | A24F 47/008 |

(Continued)

FOREIGN PATENT DOCUMENTS

WO 2015123831 A1 8/2015

OTHER PUBLICATIONS

Burseg K, EP-3170413-A1, May 2017, whole document. (Year: 2017).*

*Primary Examiner* — Michael H. Wilson
*Assistant Examiner* — Stephanie Lynn Moore
(74) *Attorney, Agent, or Firm* — Dykema Gossett PLLC

(57) ABSTRACT

Aspects of the instant disclosure relate to electronic cigarettes with two or more liquid reservoirs with liquid solutions for vaporization by an atomizer.

15 Claims, 4 Drawing Sheets

(56) References Cited

U.S. PATENT DOCUMENTS

| | | | |
|---|---|---|---|
| 2019/0357596 A1 | 11/2019 | Blick et al. | |
| 2020/0046025 A1* | 2/2020 | Otiaba | A24F 40/10 |
| 2020/0268052 A1* | 8/2020 | Potter | A61M 11/042 |

* cited by examiner

DUAL-TANK ELECTRONIC CIGARETTE

BACKGROUND

Field

The present disclosure relates to electronic cigarettes.

Background Art

Electronic cigarettes, also known as e-cigarettes (eCigs) and personal vaporizers (PVs), are electronic inhalers that vaporize or atomize a liquid solution into an aerosol mist, which is inhaled by a user. A typical rechargeable eCig has two main parts—a battery housing and a cartomizer. The battery housing typically includes a battery, a light emitting diode (LED), and a pressure sensor. The cartomizer typically includes a liquid solution, an atomizer, and a mouthpiece. The atomizer typically includes a heating coil that vaporizes the liquid solution.

To recharge the battery, a universal serial bus (USB) charger can be utilized which draws power from a computer or other power supply, converts the supplied power to the desired input for the battery, and supplies the desired input to the battery. In use, a user draws air through the atomizer, via the mouthpiece, to activate a heating coil that vaporizes the liquid solution into the air being drawn. After a number of draws, the battery must be recharged. Similarly, after a number of draws, the liquid solution within the cartomizer is depleted and must be replaced with another cartomizer.

BRIEF SUMMARY

Aspects of the present disclosure are directed to electronic cigarettes with dual tanks (also referred to as liquid reservoirs) for storing a liquid solution (such as eCig juice).

One embodiment of the present disclosure discloses an electronic cigarette including a first liquid reservoir, a second liquid reservoir, and a first atomizer with a first heating element. The first atomizer receives a liquid solution from at least one of the first liquid reservoir and the second liquid reservoir, and vaporizes the liquid solution into an airflow. In more specific embodiments, the first liquid reservoir contains a flavorent solution, and the second liquid reservoir contains a nicotine solution.

In another embodiment consistent with the present disclosure, a reservoir portion of an electronic cigarette system is disclosed. The reservoir portion includes a first liquid reservoir containing a flavorent solution, a second liquid reservoir containing a nicotine solution, and first and second atomizers. The first atomizer is positioned in fluid communication with the first liquid reservoir, receives the flavorent solution from the first liquid reservoir, and vaporizes the flavorent solution into an airflow. The second atomizer is positioned in fluid communication with the second liquid reservoir, receives the nicotine solution from the second liquid reservoir, and vaporizes the nicotine solution into the airflow. In some specific embodiments, the reservoir portion further includes a first and second wick. The first wick is positioned in fluid communication with the first liquid reservoir and the first heating element. The first wick draws the flavorent solution from the first liquid reservoir into contact with the first atomizer via capillary action. The second wick is positioned in fluid communication with the second liquid reservoir and the second heating element. The second wick draws the nicotine solution from the second liquid reservoir into contact with the second atomizer via capillary action.

Additional features, advantages, and embodiments of the disclosure may be set forth or apparent from consideration of the detailed description and drawings. Moreover, it is to be understood that the foregoing summary of the disclosure and the following detailed description and drawings are exemplary and intended to provide further explanation without limiting the scope of the disclosure as claimed.

BRIEF DESCRIPTION OF THE DRAWINGS

Various example embodiments may be more completely understood in consideration of the following detailed description in connection with the accompanying drawings.

Figure 1:
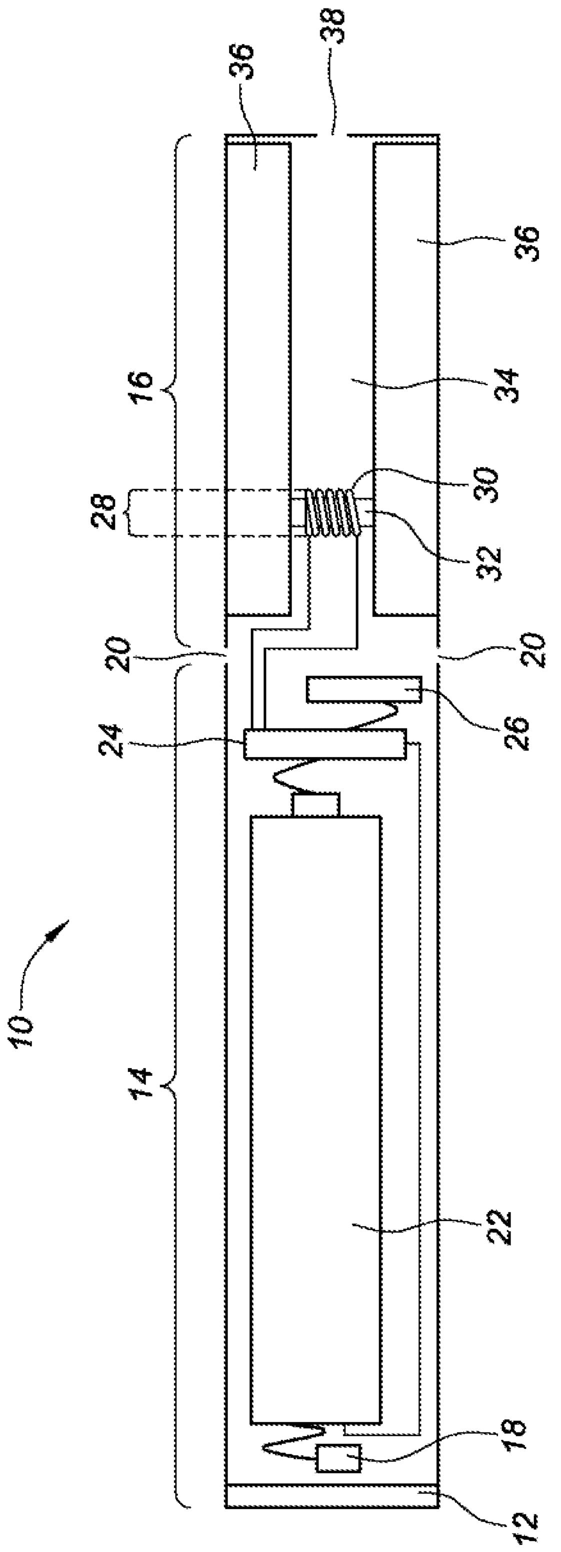
FIG. 1 is a schematic, cross-sectional illustration of a first e-cigarette embodiment, consistent with various aspects of the present disclosure.

While various embodiments discussed herein are amenable to modifications and alternative forms, aspects thereof have been shown by way of example in the drawings and will be described in detail. It should be understood, however, that the intention is not to limit the disclosure to the particular embodiments described. On the contrary, the intention is to cover all modifications, equivalents, and alternatives falling within the scope of the disclosure including aspects defined in the claims.

DETAILED DESCRIPTION OF THE DISCLOSURE

The disclosure and the various features and advantageous details thereof are explained more fully with reference to the non-limiting embodiments and examples that are described and/or illustrated in the accompanying drawings and detailed in the following. It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

Throughout the following, an electronic smoking device will be exemplarily described with reference to an e-cigarette. As is shown in FIG. 1, an e-cigarette 10 typically has a housing comprising a cylindrical hollow tube having an end cap 12. The cylindrical hollow tube may be a single-piece or a multiple-piece tube. In FIG. 1, the cylindrical hollow tube is shown as a two-piece structure having a power supply portion 14 and an atomizer/liquid reservoir portion 16. Together, the power supply portion 14 and the atomizer/liquid reservoir portion 16 form a cylindrical tube which can be approximately the same size and shape as a conventional cigarette, typically about 100 millimeters ("mm") with a 7.5 mm diameter, although lengths may range from 70 to 150 or 180 mm, and diameters from 5 to 28 mm.

The power supply portion 14 and atomizer/liquid reservoir portion 16 are typically made of metal (e.g., steel or aluminum, or of hardwearing plastic) and act together with the end cap 12 to provide a housing to contain the components of the e-cigarette 10. The power supply portion 14 and the atomizer/liquid reservoir portion 16 may be configured to fit together by, for example, a friction push fit, a snap fit, a bayonet attachment, a magnetic fit, or screw threads. The end cap 12 is provided at the front end of the power supply portion 14. The end cap 12 may be made from translucent plastic or other translucent material to allow a light-emitting diode (LED) 18 positioned near the end cap to emit light through the end cap. Alternatively, the end cap may be made of metal or other materials that do not allow light to pass.

An air inlet may be provided in the end cap, at the edge of the inlet next to the cylindrical hollow tube, anywhere along the length of the cylindrical hollow tube, or at the connection of the power supply portion 14 and the atomizer/liquid reservoir portion 16. FIG. 1 shows a pair of air inlets 20 provided at the intersection between the power supply portion 14 and the atomizer/liquid reservoir portion 16.

A power supply, preferably a battery 22, the LED 18, control electronics 24 and, optionally, an airflow sensor 26 are provided within the cylindrical hollow tube power supply portion 14. The battery 22 is electrically connected to the control electronics 24, which are electrically connected to the LED 18 and the airflow sensor 26. In this example, the LED 18 is at the front end of the power supply portion 14, adjacent to the end cap 12; and the control electronics 24 and airflow sensor 26 are provided in the central cavity at the other end of the battery 22 adjacent the atomizer/liquid reservoir portion 16.

The airflow sensor 26 acts as a puff detector, detecting a user puffing or sucking on the atomizer/liquid reservoir portion 16 of the e-cigarette 10. The airflow sensor 26 can be any suitable sensor for detecting changes in airflow or air pressure, such as a microphone switch including a deformable membrane which is caused to move by variations in air pressure. Alternatively, the sensor may be, for example, a Hall element or an electro-mechanical sensor.

The control electronics 24 are also connected to an atomizer 28. In the example shown, the atomizer 28 includes a heating coil 30 which is wrapped around a wick 32 extending across a central passage 34 of the atomizer/liquid reservoir portion 16. The central passage 34 may, for example, be defined by one or more walls of the liquid reservoir and/or one or more walls of the atomizer/liquid reservoir portion 16 of the e-cigarette 10. The coil 30 may be positioned anywhere in the atomizer 28 and may be transverse or parallel to a longitudinal axis of a cylindrical liquid reservoir 36. The wick 32 and heating coil 30 do not completely block the central passage 34. Rather an air gap is provided on either side of the heating coil 30 enabling air to flow past the heating coil 30 and the wick 32. The atomizer may alternatively use other forms of heating elements, such as ceramic heaters, or fiber or mesh material heaters. Nonresistance heating elements such as sonic, piezo, and jet spray may also be used in the atomizer in place of the heating coil.

The central passage 34 is surrounded by the cylindrical liquid reservoir 36 with the ends of the wick 32 abutting or extending into the liquid reservoir 36. The wick 32 may be a porous material such as a bundle of fiberglass fibers or cotton or bamboo yarn, with liquid in the liquid reservoir 36 drawn by capillary action from the ends of the wick 32 towards the central portion of the wick 32 encircled by the heating coil 30.

The liquid reservoir 36 may alternatively include wadding (not shown in FIG. 1) soaked in liquid which encircles the central passage 34 with the ends of the wick 32 abutting the wadding. In other embodiments, the liquid reservoir may comprise a toroidal cavity arranged to be filled with liquid and with the ends of the wick 32 extending into the toroidal cavity.

An air inhalation port 38 is provided at the back end of the atomizer/liquid reservoir portion 16 remote from the end cap 12. The inhalation port 38 may be formed from the cylindrical hollow tube atomizer/liquid reservoir portion 16 or may be formed in an end cap.

In use, a user sucks on the e-cigarette 10. This causes air to be drawn into the e-cigarette 10 via one or more air inlets, such as air inlets 20, and to be drawn through the central passage 34 towards the air inhalation port 38. The change in air pressure which arises is detected by the airflow sensor 26, which generates an electrical signal that is passed to the control electronics 24. In response to the signal, the control electronics 24 activate the heating coil 30, which causes liquid present in the wick 32 to be vaporized creating an aerosol (which may comprise gaseous and liquid components) within the central passage 34. As the user continues to suck on the e-cigarette 10, this aerosol is drawn through the central passage 34 and inhaled by the user. At the same time, the control electronics 24 also activate the LED 18 causing the LED 18 to light up, which is visible via the translucent end cap 12. Activation of the LED may mimic the appearance of a glowing ember at the end of a conventional cigarette. As liquid present in the wick 32 is converted into an aerosol, more liquid is drawn into the wick 32 from the liquid reservoir 36 by capillary action and thus is available to be converted into an aerosol through subsequent activation of the heating coil 30.

Some e-cigarettes are intended to be disposable and the electric power in the battery 22 is intended to be sufficient to vaporize the liquid contained within the liquid reservoir 36, after which the e-cigarette 10 is thrown away. In other embodiments, the battery 22 is rechargeable and the liquid reservoir 36 is refillable. In the cases where the liquid reservoir 36 is a toroidal cavity, this may be achieved by refilling the liquid reservoir 36 via a refill port (not shown in FIG. 1). In other embodiments, the atomizer/liquid reservoir portion 16 of the e-cigarette 10 is detachable from the power supply portion 14 and a new atomizer/liquid reservoir portion 16 can be fitted with a new liquid reservoir 36 thereby replenishing the supply of liquid. In some cases, replacing the liquid reservoir 36 may involve replacement of the heating coil 30 and the wick 32 along with the replacement of the liquid reservoir 36. A replaceable unit comprising the atomizer 28 and the liquid reservoir 36 may be referred to as a cartomizer.

The new liquid reservoir may be in the form of a cartridge (not shown in FIG. 1) defining a passage (or multiple passages) through which a user inhales aerosol. In other embodiments, the aerosol may flow around the exterior of the cartridge to the air inhalation port 38.

Of course, in addition to the above description of the structure and function of a typical e-cigarette 10, variations also exist. For example, the LED 18 may be omitted. The airflow sensor 26 may be placed, for example, adjacent to the end cap 12 rather than in the middle of the e-cigarette. The airflow sensor 26 may be replaced by, or supplemented with, a switch which enables a user to activate the e-cigarette manually rather than in response to the detection of a change in air flow or air pressure.

Different types of atomizers may be used. Thus, for example, the atomizer may have a heating coil in a cavity in the interior of a porous body soaked in liquid. In this design, aerosol is generated by evaporating the liquid within the porous body either by activation of the coil heating the porous body or alternatively by the heated air passing over or through the porous body. Alternatively, the atomizer may use a piezoelectric atomizer to create an aerosol either in combination or in the absence of a heater.

Figure 2:
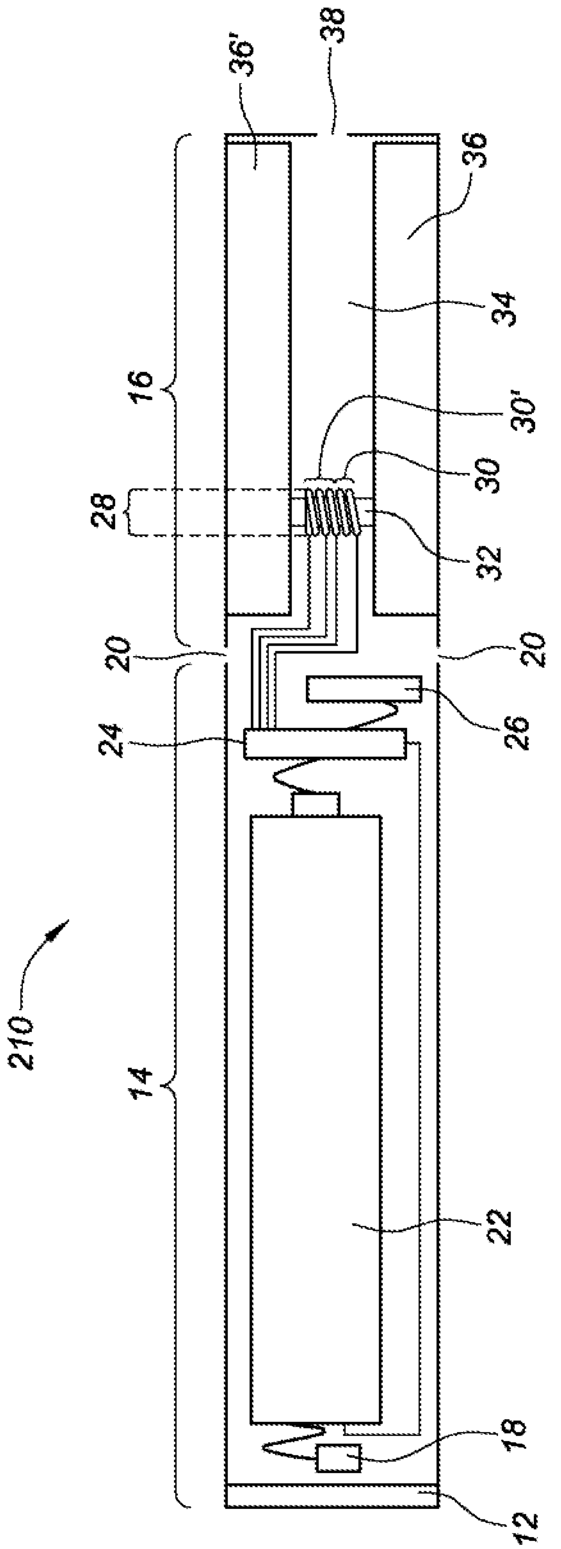
FIG. 2 is a schematic, cross-sectional illustration of a second e-cigarette embodiment, consistent with various aspects of the present disclosure.

FIG. 2 is a schematic, cross-sectional illustration of a second e-cigarette embodiment 210, consistent with various aspects of the present disclosure. The e-cigarette 210 includes two liquid reservoirs 36 and 36' which are fluidly coupled to a wick 32. The wick delivers the liquid solution within the reservoirs into close proximity (or contact) with one of heating coils 30 and 30' (via capillary action). In various embodiments consistent with the present disclosure, liquid reservoir 36 may include a solution including nicotine and liquid reservoir 36' may include one or more flavorent solutions. Each of the heating coils 30 and 30' may be individually driven by control electronics 24 to vary the vaporization of the nicotine and flavorents into an airstream delivered to a user via inhalation port 38. Aspects of the embodiment of FIG. 2 enable customizable flavor profiles, and “throat-hits” over the length of a user’s draw. Moreover, for implementations where nicotine delivery is being metered or otherwise limited, a user may continue to receive flavorent during a draw or subsequent draws even when the nicotine limit for the user has been exceeded for a given period of time.

In the embodiment of FIG. 2, wick 32 may be in fluid communication with both liquid reservoirs 36 and 36'. Alternatively, each heating coil 30 and 30' may be supplied liquid via independent wicks which are each in fluid communication with a single liquid reservoir. In yet further more specific embodiments, the liquid reservoirs may share a single heating coil in fluid communication with both of the reservoirs via a shared wick. In such an embodiment, control electronics 24 may vary vaporization of the respective liquids in each reservoir by pulsing the heating coils to maintain a heating coil at a temperature associated with a vaporization temperature of one or more of the liquids in the reservoirs. For example, a nicotine solution in a first liquid reservoir 36 may vaporize at a first temperature while a flavorent solution in a second liquid reservoir 36' may have a second vaporization temperature which is lower than the first temperature. Accordingly, the control electronics may operate the heating coil at the first temperature to vaporize only the flavorent for a period of time, and then increasing the heating coil temperature to the first temperature to vaporize both the flavorent and nicotine simultaneously for the remainder of the user draw. This sequence of vaporization results in a desirable, smooth flavor profile during inhalation by a user. This flavor profile may also be implemented by e-cig embodiments with dedicated heating coils for each liquid reservoir to create a desired flavor dominance in the resulting aerosol delivered to the user.

In various embodiments of the present disclosure, liquid reservoirs 36 and 36' may contain a nicotine solution and a flavorent solution, respectively, or a first and second nicotine+flavorent solution (e.g., blueberry and grape). The user may then select, without replacing a reservoir portion 16 of the e-cig, grape, blueberry, or a combination thereof. The nicotine content of the solutions in the respective liquid reservoirs may also vary. In such an embodiment, the user may selectably vary the nicotine content of a draw by driving a first heating coil 30 in fluid communication with liquid reservoir 36 or a second heating coil 30' in fluid communication with liquid reservoir 36'. For example, liquid reservoir 36 contains a liquid solution with a nicotine concentration of 5% and liquid reservoir 36' contains a liquid solution with a nicotine concentration of 2.5%. In yet further implementations, both the first and second heating coils may be driven simultaneously to deliver the user a draw with a nicotine concentration of 7.5%.

In further more specific embodiments of the system disclosed in FIG. 2, control electronics 24 may receive a signal from airflow sensor 26 indicative of a user draw which exceeds the ability of the wick 32 to deliver sufficient liquid from a liquid reservoir 36 to heating coil 30. That is, liquid solution is vaporized by the coil faster than the wick can deliver the liquid solution to the coil. Prolonged operation of the eCig in this manner will result in the heating coil vaporizing all of the liquid solution in contact with the coil and operating dry, which may result in the user experiencing an undesirable taste. To prevent such undesirable operating characteristics of the eCig, the control electronics 24 may drive the coil 30 at a reduced power or de-power the coil entirely (for a short period of time) to allow for the wick 32 to re-wet the coil 30. Absent a secondary heating coil, the user would experience an appreciable decrease in flavor, for example. Accordingly, the control electronics 24 may extend a desirable draw experience during a prolonged or particularly strong draw from a user by driving a second coil 30' until coil 30 is rewetted by wick 32.

In yet further embodiments, the eCig may be configured to provide an increased throat hit in response to a strong draw. In such an embodiment, control electronics 24 may receive an electronic signal from airflow sensor 26 indicative of a user draw exceeding a threshold. In response to the strong draw, the control electronics may drive both heating coils 30 and 30' to facilitate an increased throat hit. That is, a maintained (or increased) nicotine concentration for a given volume of inhalation by the user.

Figure 3:
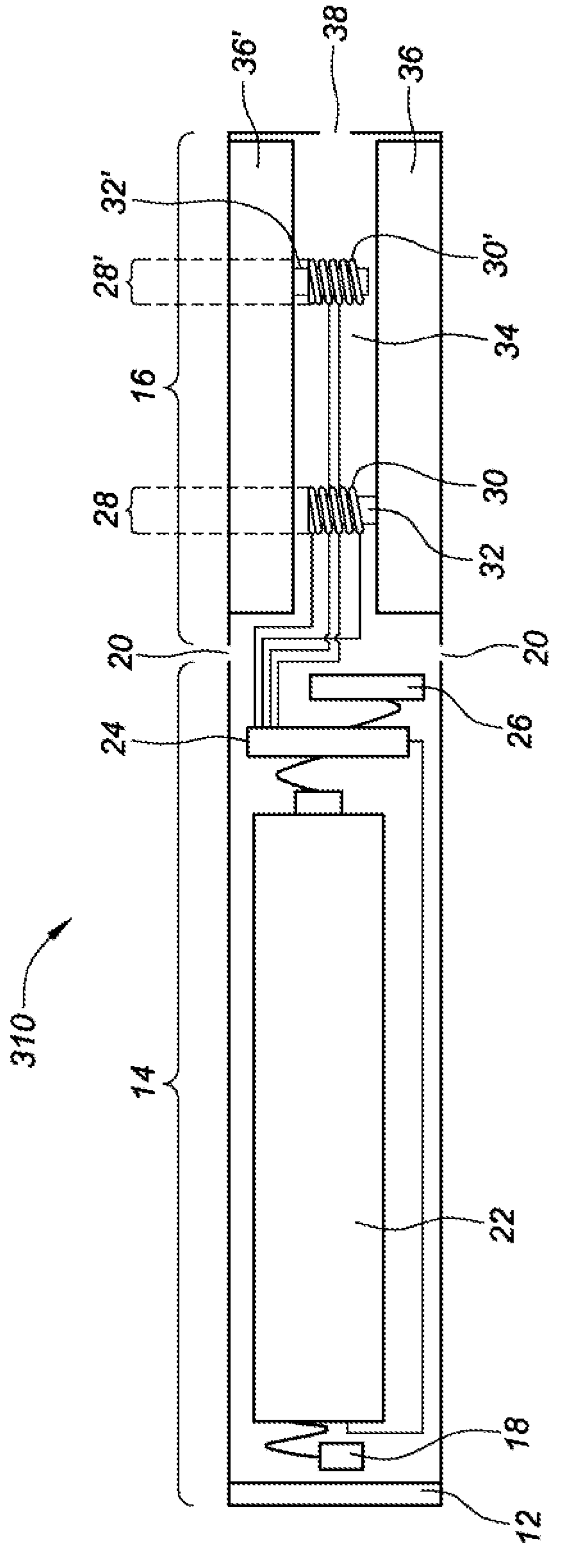
FIG. 3 is a schematic, cross-sectional illustration of a third e-cigarette embodiment, consistent with various aspects of the present disclosure.

FIG. 3 is a schematic cross-sectional illustration of a third e-cigarette embodiment 310, consistent with various aspects of the present disclosure. Aspects of the present embodiment are directed to an eCig 310 with dual liquid reservoirs 36 and 36'. Each of the liquid reservoirs are placed into fluid communication with respective wicks 32 and 32', and heating coils 30 and 30'. The eCig 310 facilitates an enhanced level of functionality via flavor and nicotine delivery customization throughout a user’s draw. For example, the delivery of nicotine from a first liquid reservoir 36 and a flavorent from a second liquid reservoir 36' may be entirely independent of one another by virtue of completely independent atomizers 28 and 28' which are further independently addressable by control electronics 24.

In embodiments consistent with the eCig 310 of FIG. 3, a user may customize the nicotine and flavorent delivery based on various draw characteristics such as length, strength, and number of draws during a smoking session. For example, nicotine delivery may be limited for a given smoking session. In such a case, once the nicotine delivery threshold has been reached, the eCig will only vaporize flavorent into the airflow inhaled by the user. In another example, a user may vary the flavor profile over a smoking session by varying the nicotine and flavorent vaporizations for each of the subsequent draws. As a further example, a single draw exceeding a threshold time may disable further nicotine vaporization while maintaining a flavorent vaporization, limiting nicotine uptake for a given draw.

During operation of the eCig 310, air enters air inlets 20 of the eCig in response to a user draw at inhalation port 38 which draws a vacuum pressure within central passage 34. The air is drawn from the air inlets 20 into the central passage where the air first mixes with a first aerosol from atomizer 28 and then further mixes with a second aerosol from atomizer 28'. The mixture then exits the eCig at the inhalation port is inhaled by the user.

Figure 4:
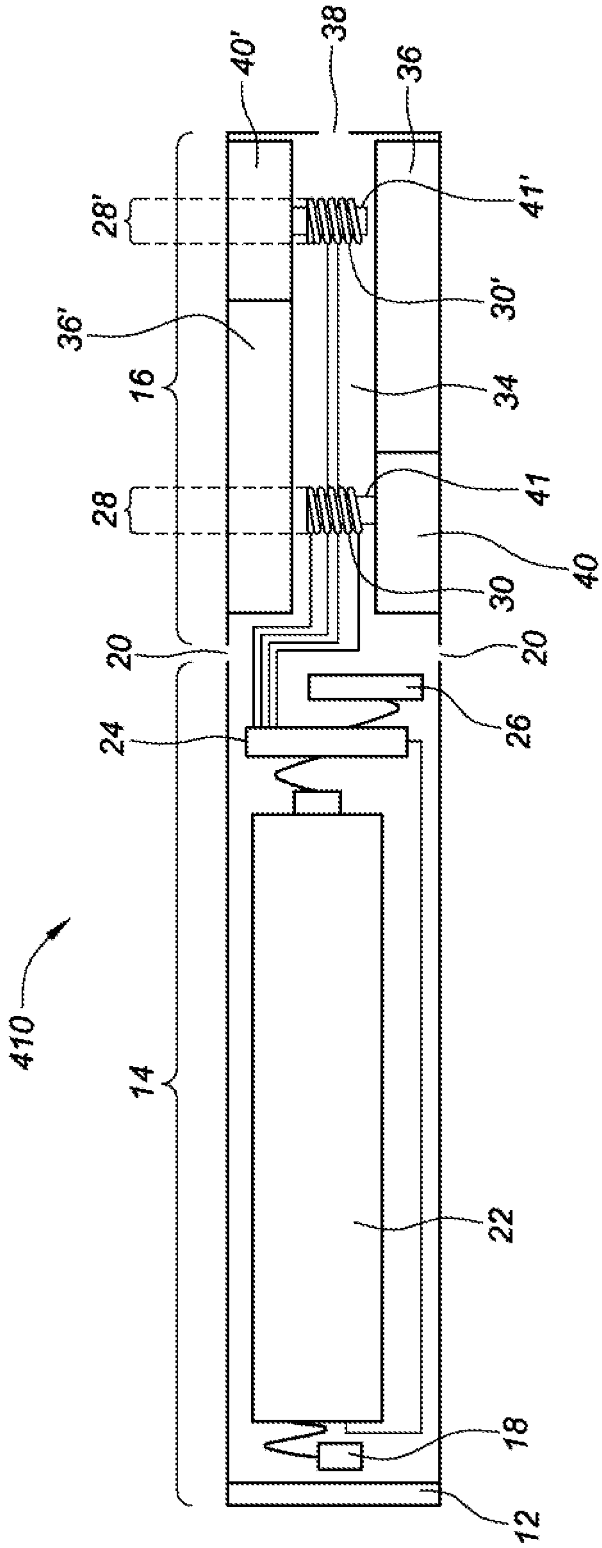
FIG. 4 is a schematic, cross-sectional illustration of a fourth e-cigarette embodiment, consistent with various aspects of the present disclosure.

FIG. 4 is a schematic cross-sectional illustration of a fourth e-cigarette embodiment 410, consistent with various aspects of the present disclosure. As shown in FIG. 4, a reservoir portion 16 is coupled to a power supply portion 14 to form the eCig 410. Instead of using passive capillary action to wet heating coils 30 and 30' (via wicks), pumps 40 and 40', which are in fluid communication between liquid reservoirs 36 and 36' and the heating coils, actively draw the liquid from the reservoirs to the heating coils. The eCig 410, by virtue of the pumps, exhibits improved volumetric flow rates to the heating coils as well as increased control. In the present embodiment, each of the pumps are independently addressable by control electronics 24 and pump operation may be variably driven based on a user's draw as sensed by airflow sensor 26 or other user desired characteristics. For example, enhanced throat hit for large volume draws and increased flavor for light volume draws.

To further facilitate even distribution of the liquid on the heating coils, atomizers 28 and 28' may include frits 41 and 41'. Each frit includes a number of small apertures which dispenses the liquid from the liquid reservoirs evenly across the heating coils to prevent undesirable dry burning of the heating coils during operation or over-application and boiling of the liquid.

In some specific implementations, eCig 410 may include a single heating coil with a frit that delivers a combination of nicotine and flavorent solutions from two separate liquid reservoirs using two independently controllable pumps. The frit mixes the two disparate solutions before applying the combined solution onto the heating coil via a plurality of apertures in the frit. In yet other embodiments, a single coil may receive liquid from two or more frits, with each frit delivering a different liquid to the coil. For example, a first frit (around which circumferentially extends a first portion of the heating coil) may deliver a nicotine solution, while a second frit (around which extends circumferentially a second portion of the heating coil) may deliver a flavorent solution. In such an embodiment, airflow within an aperture extending through the fits mixes with the aerosol produced by the heating coil. In some other embodiments, the one or more frits may be placed within an inner diameter of one or more heating coils, and the airflow around an outer diameter of the frit mixes with the aerosolized nicotine and flavorent before being inhaled by a user via inhalation port 38.

For a desirable flavor profile during a user draw, control electronics 24 of eCig 410 may receive an electrical signal from the airflow sensor 26 indicative of a user draw and drive pump 40. Pump 40 delivers a flavorent solution from liquid reservoir 36 to atomizer 28 which is also powered in response to the indication of a user draw. After a short period of time, the control electronics drives pump 40' to deliver a nicotine solution from liquid reservoir 36' to atomizer 28'. A heating coil 30' of atomizer 28' is then powered by the control electronics to aerosolize the nicotine solution delivered to the heating coil 30'. This progressive delivery of flavorent followed by nicotine to a user has been found to create a smooth flavor profile.

This application is related to U.S. provisional application No. 62/513,865, filed 1 Jun. 2017; the entirety of which is hereby incorporated by reference as though fully set forth herein.

Various aspects of the present disclosure are directed toward a pumping mechanism for electronic cigarette applications. Specifically, a pumping mechanism for delivering eCig juice from a liquid reservoir 36 to an atomizer 28 for vaporization. Various pumps in accordance with the present disclosure may include two or more one-way valves which are positioned in-line between the liquid reservoir and an atomizer. The pumping action takes place in the space between the valves (e.g., a diaphragm). The diaphragm between the valves expands and contracts successively to pump eCig juice from the liquid reservoir to the atomizer. In some embodiments, the pumping action is powered by an oscillating signal generator that drives a wire coil. The wire coil, in response to the oscillating signal, creates an oscillating magnetic field that acts on a permanent magnet that has been coupled to a portion of the diaphragm. The permanent magnet, in response to the oscillating magnetic field, causes the diaphragm to expand and contract. The expansion and contraction changes a pressure within the diaphragm which causes fluid to move through the pump. Such pumps are often referred to as oscillating diaphragm pumps. When applied to various embodiments of the present disclosure, the oscillating diaphragm pump (e.g., 40 and 40') may be positioned within eCig 410 to facilitate the flow of eCig juice from a liquid reservoir 36, 36', through an inlet valve of the pump (which may be located in fluid contact with the tank), and out of an outlet valve. The outlet valve may be placed in close proximity to an atomizer 28/28' to facilitate disbursement of the eCig juice onto a heating coil 30/30' therein.

When control electronics 24 within eCig 410 detects a user's draw (via airflow sensor 26) on the eCig, the control electronics generates and transmits an oscillating signal to an electro-magnet of the pump 40/40'. The electro-magnet, in response to the oscillating generator signal, radiates an oscillating magnetic field in proximity to a permanent magnet. The permanent magnet, in response to the magnetic field, exerts a fluctuating force on the oscillating diaphragm pump 40/40'. When the magnetic field emitted from the electro-magnet opposes the magnetic field of the permanent magnet, the diaphragm contracts. This increases the pressure within the diaphragm, closing inlet valve (e.g., a duckbill valve), and opening outlet valve. Accordingly, eCig juice from liquid reservoir 36/36' is propelled through the pump 40/40' and onto an atomizer 28/28'.

When the magnetic field of the electro-magnet reverses, the permanent magnet and the electro-magnet attract, which causes an expansion of the diaphragm. The expanded diaphragm is placed into a vacuum pressure that opens the inlet valve; simultaneously, the vacuum pressure causes the outlet valve to close preventing a flow of eCig juice through the outlet and onto frit 41/41'.

Where the diaphragm of the oscillating diaphragm pump is expanded, eCig juice within the liquid reservoir is drawn into the diaphragm. Where the diaphragm is contracted, eCig juice within the diaphragm flows onto the atomizer 28/28'. The oscillating diaphragm pump 40/40' may be driven by a magnetic field with variable voltage and frequency to adjust the pumping rate of the pump. Moreover, the diaphragm travel length may be adjustable or designed with a specific travel length to suit a specific pumping application.

The pumping process of the oscillating diaphragm pump 40/40' continues, for example, until control electronics 24 within the eCig 410 detects a user's discontinued draw on the eCig, and disables the oscillating signal generator—which thereby dissipates the magnetic field acting on a permanent magnet of the pump 40/40'. In some embodiments, the control electronics may be programmed to turn-off the oscillating diaphragm pump 40/40' after a set time. In other embodiments, the pump may be disabled after the liquid reservoir 36/36' has run out of eCig juice, or a current draw from the heating coil (during vaporization) indicates that the heating coil is inundated with eCig juice.

In some embodiments of an eCig with an eCig juice pump, a glass or ceramic frit may be used to dispense the eCig juice onto the heating element. In other embodiments, a small, ceramic-coated steel tube with apertures may be used to dispense the eCig juice onto the heating element. In yet other embodiments, a glass airway with apertures may be used to dispense the eCig juice onto the heating element.

Various eCigs in accordance with the present disclosure include control electronics, the control electronics may detect the strength of a user's draw via a signal transmitted to the control electronics from an airflow sensor. In response to the strength of the user's draw, the control electronics may adjust the transmitted oscillating electric signal that drives an electro-magnet in proximity to a pump. In response to the magnetic field emitted by the electro-magnet, a permanent magnet coupled to the pump is attracted and repealed from the electro-magnet in sequence to pump the eCig juice from the liquid reservoir to an atomizer. The control electronics may further adjust the current delivered to a heating element of the atomizer to maintain a consistent vapor content per airflow volume delivered to a user.

While various embodiments of the present disclosure are directed to eCigs with two liquid reservoirs, a skilled artisan would readily appreciate in view of the present disclosure how three or more liquid reservoirs may be implemented within an eCig.

Based upon the above discussion and illustrations, those skilled in the art will readily recognize that various modifications and changes may be made to the various embodiments without strictly following the exemplary embodiments and applications illustrated and described herein. For example, liquid reservoirs and/or pumps may be repositioned, relative to one another, to facilitate design requirements for a specific application. Moreover, while some aspects of the present disclosure have been presented in the context of oscillating diaphragm pumps, the teachings of the present disclosure may be readily applied, in view of the above, to various other types of pumps. For example, positive displacement pumps—including reciprocating, metering, rotary-type, hydraulic, peristaltic, gear, screw, flexible impeller, piston, progressive cavity pump, among others. Such modifications do not depart from the true spirit and scope of various aspects of the invention, including aspects set forth in the claims.

Various modules or other circuits may be implemented to carry out one or more of the operations and activities described herein and/or shown in the figures. In these contexts, a "module" is a circuit that carries out one or more of these or related operations/activities (e.g., controller circuitry). For example, in certain of the above-discussed embodiments, one or more modules are discrete logic circuits or programmable logic circuits configured and arranged for implementing these operations/activities. In certain embodiments, such a programmable circuit is one or more computer circuits programmed to execute a set (or sets) of instructions (and/or configuration data). The instructions (and/or configuration data) can be in the form of firmware or software stored in and accessible from a memory (circuit). As an example, first and second modules include a combination of a CPU hardware-based circuit and a set of instructions in the form of firmware, where the first module includes a first CPU hardware circuit with one set of instructions and the second module includes a second CPU hardware circuit with another set of instructions.

Certain embodiments are directed to a computer program product (e.g., nonvolatile memory device), which includes a machine or computer-readable medium having stored thereon instructions which may be executed by controller circuitry (or other electronic device) to perform these operations/activities.

It should be noted that the features illustrated in the drawings are not necessarily drawn to scale, and features of one embodiment may be employed with other embodiments as the skilled artisan would recognize, even if not explicitly stated herein. Descriptions of well-known components and processing techniques may be omitted so as to not unnecessarily obscure the embodiments of the disclosure. The examples used herein are intended merely to facilitate an understanding of ways in which the disclosure may be practiced and to further enable those of skill in the art to practice the embodiments of the disclosure. Accordingly, the examples and embodiments herein should not be construed as limiting the scope of the disclosure. Moreover, it is noted that like reference numerals represent similar parts throughout the several views of the drawings.

The terms "including," "comprising" and variations thereof, as used in this disclosure, mean "including, but not limited to," unless expressly specified otherwise.

The terms "a," "an," and "the," as used in this disclosure, means "one or more," unless expressly specified otherwise.

Although process steps, method steps, algorithms, or the like, may be described in a sequential order, such processes, methods and algorithms may be configured to work in alternate orders. In other words, any sequence or order of steps that may be described does not necessarily indicate a requirement that the steps be performed in that order. The steps of the processes, methods or algorithms described herein may be performed in any order practical. Further, some steps may be performed simultaneously.

When a single device or article is described herein, it will be readily apparent that more than one device or article may be used in place of a single device or article. Similarly, where more than one device or article is described herein, it will be readily apparent that a single device or article may be used in place of the more than one device or article. The functionality or the features of a device may be alternatively embodied by one or more other devices which are not explicitly described as having such functionality or features.

LIST OF REFERENCE SIGNS

10 electronic smoking device
12 end cap
14 power supply portion
16 atomizer/liquid reservoir portion
18 light-emitting diode (LED)
20 air inlets
22 battery
24 control electronics

26 airflow sensor
28 atomizer
30 heating coil
32 wick
34 central passage
36 liquid reservoir
38 air inhalation port
210 electronic smoking device
30' heating coil
36' liquid reservoir
310 electronic smoking device
28' atomizer
32' wick
410 electronic smoking device
40 pump
40' pump
41 frit
41' frit

What is claimed is:

1. An electronic cigarette comprising:

a first liquid reservoir;

a second liquid reservoir; and a first atomizer including a first heating element, the first atomizer configured and arranged to receive a liquid solution from at least one of the first liquid reservoir and the second liquid reservoir, and vaporize the liquid solution into an airflow; and wherein the first atomizer is further configured and arranged to receive a flavorent solution from the first liquid reservoir;

a second atomizer including a second heating element, the second atomizer configured and arranged to receive a nicotine solution from the second liquid reservoir, and vaporize the nicotine into the airflow; and a ceramic frit that is in fluid communication with the first liquid reservoir, the second liquid reservoir, the first heating element, and the second heating element; and wherein the ceramic frit is located within the first and second heating elements and is configured and arranged to draw the flavorent solution from the first liquid reservoir into contact with the first heating element and the nicotine solution from the second liquid reservoir into contact with the second heating element via capillary action, wherein the first atomizer and the second atomizer are configured to be driven simultaneously.

2. The electronic cigarette of claim 1, further including control electronics communicatively coupled to the first atomizer and the second atomizer, the control electronics configured and arranged to independently control vaporization of the nicotine and flavorent solutions into the airflow by pulsing one or both of power signals delivered to the first and the second atomizer.

3. The electronic cigarette of claim 2, further including an airflow sensor communicatively coupled to the control electronics, the airflow sensor configured and arranged to sense the airflow through the electronic cigarette and transmit an electrical signal to the control electronics indicative of the airflow, the control electronics further configured and arranged to vary the vaporization of the nicotine and flavorent solutions into the airflow based at least in part on the airflow sensed and to maintain at least one of the first and second atomizers at or above a temperature associated with vaporization of the nicotine solution and/or the flavorent solution during the period in which the airflow sensor is sensing airflow.

4. An electronic cigarette system comprising:

a reservoir portion including a first liquid reservoir containing a flavorent solution;

a second liquid reservoir containing a nicotine solution;

a first atomizer with a first heating element and in fluid communication with the first liquid reservoir, the first atomizer configured and arranged to receive the flavorent solution from the first liquid reservoir, and vaporize the flavorent solution into an airflow;

a second atomizer with a second heating element and in fluid communication with the second liquid reservoir, the second atomizer configured and arranged to receive the nicotine solution from the second liquid reservoir, and vaporize the nicotine solution into the airflow;

a first pump in fluid communication between the first liquid reservoir and the first atomizer;

a second pump in fluid communication between the second liquid reservoir and the second atomizer; and wherein the first and second pumps are configured and arranged to draw the flavorent and nicotine solutions from the liquid reservoirs to the respective heating coils; and control electronics communicatively coupled to the first and second atomizer, and the first and second pump; and an airflow sensor communicatively coupled to the control electronics, the airflow sensor configured and arranged to sense the airflow through the electronic cigarette and transmit an electrical signal to the control electronics indicative of the airflow, wherein the first and second pumps are configured to be variably driven based on an amount of airflow sensed by the airflow sensor;

a frit located within the first and second heating elements and in fluid communication with the first and second liquid reservoir via the first and second pump and direct fluid communication with the first and second atomizers, the frit including a plurality of apertures extending through the frit.

5. The electronic cigarette system of claim 4, further including a power supply portion mechanically coupled to the reservoir portion, the power supply portion including the control electronics communicatively coupled to the first atomizer and the second atomizer, the control electronics configured and arranged to independently control vaporization of the nicotine and flavorent into the airflow.

6. The electronic cigarette system of claim 5, wherein the airflow sensor configured and arranged to sense the airflow through the reservoir portion, the control electronics further configured and arranged to vary the vaporization of the nicotine and flavorent into the airflow based at least in part on the sensed airflow.

7. The electronic cigarette system of claim 4, further including a power supply portion mechanically coupled to the reservoir portion, the power supply portion including the control electronics communicatively coupled to the first and second atomizer, and the first and second pump, the control electronics configured and arranged to independently control the first pump and the first atomizer, and the second pump and the second atomizer, and thereby independently control vaporization of the nicotine solution and the flavorent solution into the airflow.

8. The electronic cigarette system of claim 4, wherein the frit is configured and arranged to evenly distribute the flavorent solution from the first liquid reservoir along a length and circumference of the first atomizer via the plurality of apertures.

9. The electronic cigarette system of claim 4, wherein the frit is a ceramic-coated steel tube.

10. The electronic cigarette of claim 2, further including an airflow sensor communicatively coupled to the control electronics, the airflow sensor configured and arranged to sense the airflow through the electronic cigarette and transmit an electrical signal to the control electronics indicative of the airflow, the control electronics further configured and arranged to generate and transmit a first power signal to the first atomizer to vaporize only the flavorent solution for a first period of time, and then to transmit a second power signal to the second atomizer, simultaneous with the first power signal, to vaporize the flavorent and the nicotine solutions for a second period of time until the airflow sensor no longer senses airflow and in response thereto the control electronics deactivates the first and second power signals.

11. The electronic cigarette system of claim 4, wherein the first and second pumps are oscillating diaphragm pumps.

12. An electronic cigarette system comprising:

a reservoir portion including a first liquid reservoir containing a flavorent solution;

a second liquid reservoir containing a nicotine solution; and a first atomizer with first and second heating elements and in fluid communication with the first and second liquid reservoir, the first atomizer configured and arranged to receive and vaporize the flavorent solution and the nicotine solution into an airflow;

a frit is positioned within the first and second heating elements and in fluid communication between the first liquid reservoir, the second liquid reservoir and the first atomizer, the frit including a plurality of apertures extending through the frit, and the frit is configured and arranged to evenly distribute the flavorent solution and the nicotine solution along a length and circumference of the first atomizer;

a first pump in fluid communication between the first liquid reservoir and the first atomizer; and a second pump in fluid communication between the second liquid reservoir and the first atomizer;

control electronics communicatively coupled to the first and second atomizer, and the first and second pump; and an airflow sensor communicatively coupled to the control electronics, the airflow sensor configured and arranged to sense the airflow through the electronic cigarette and transmit an electrical signal to the control electronics indicative of the airflow, wherein the first and second pumps are configured to be variably driven based on an airflow amount sensed by the airflow sensor;

wherein the first and second pumps are configured and arranged to draw the nicotine and flavorent solution from the first and second liquid reservoirs through the frit and into contact with the first atomizer.

13. The electronic cigarette system of claim 12, wherein the frit is a ceramic-coated steel tube.

14. The electronic cigarette system of claim 12, wherein the frit is further configured and arranged to mix the flavorent solution and the nicotine solution before applying the combined solution onto the first atomizer via the plurality of apertures.

15. The electronic cigarette system of claim 12, wherein the control electronics configured and arranged to independently control vaporization of the nicotine and flavorent into the airflow.

* * * * *